United States Patent
Cox

[19]

[11] Patent Number: 5,879,550
[45] Date of Patent: Mar. 9, 1999

[54] CLIP FOR THE SUPPORT OF A CLARIFIER AND A DROPLINE IN AN AERATED WASTEWATER TREATMENT TANK

[75] Inventor: Christopher Edward Cox, Baton Rouge, La.

[73] Assignee: Delta Environmental Products, Inc., Denham Springs, La.

[21] Appl. No.: 7,620

[22] Filed: Jan. 15, 1998

Related U.S. Application Data

[63] Continuation-in-part of Ser. No. 702,969, Aug. 26, 1996, abandoned.

[51] Int. Cl.⁶ ....................................................... C02F 3/20
[52] U.S. Cl. ...................... 210/175.4; 210/197; 210/220; 210/256; 210/541
[58] Field of Search .............................. 210/195.3, 195.4, 210/220, 256, 258, 259, 197, 532.1, 541, 542; 248/65, 58, 62, 71, 74.1, 75, 309.1, 315, 300, 68.1, 174, 74.2, 76, 79, 89

[56] References Cited

U.S. PATENT DOCUMENTS

| | | | |
|---|---|---|---|
| 1,066,706 | 7/1913 | Caine | 248/300 X |
| 2,638,643 | 5/1953 | Olson | 248/300 X |
| 3,189,305 | 6/1965 | Willenborg | 248/74.1 |
| 3,363,864 | 1/1968 | Olgree | 248/74.2 X |
| 4,009,106 | 2/1977 | Smith | 210/195.3 |
| 4,408,742 | 10/1983 | Korb | 248/74.1 |
| 4,572,695 | 2/1986 | Gilb | 248/300 X |
| 4,650,577 | 3/1987 | Hansel | 210/195.3 |
| 4,700,737 | 10/1987 | Nelson | 248/76 X |
| 4,983,285 | 1/1991 | Nolen | 210/256 |
| 5,221,470 | 6/1993 | McKinney | 210/195.4 |
| 5,490,935 | 2/1996 | Guy | 210/620 |

*Primary Examiner*—Christopher Upton
*Attorney, Agent, or Firm*—Roy, Kiesel & Tucker, PLC

[57] ABSTRACT

A clip for supporting the clarifier and the droplines in a wastewater treatment system is disclosed. The clip comprises a pair of parallel main plates separated by a bracing plate. The bracing plate is perpendicular to the main plates and is attached to the ends of each. Attached to the free ends of each of the main plates are a pair of mounting plates. These mounting plates are parallel to the bracing plate. In a preferred embodiment, the main plates each contain a hole. This pair of holes are vertically aligned, and each hole is sized to contain a dropline.

14 Claims, 3 Drawing Sheets

CLIP FOR THE SUPPORT OF A CLARIFIER AND A DROPLINE IN AN AERATED WASTEWATER TREATMENT TANK

CONTINUATION-IN-PART

This is a continuation-in-part of U.S. patent application Ser. No. 08/702,969, now abandoned, filed Aug. 26, 1996, the contents of which are hereby incorporated by reference in their entirety.

BACKGROUND OF THE INVENTION

Prior Art:

The invention relates generally to clips used in wastewater treatment tanks, such as that disclosed in U.S. Pat. No. 5,490,935, having a central conical clarifier and a plurality of droplines encircling the clarifier. In such systems, compressed air is generally pumped through the droplines and into the wastewater in the tank in order to foster the growth of aerobic bacteria.

The conical clarifier usually has a lip at its upper edge. This lip rests on a series of brackets placed on the tank walls. A typical bracket used is an L-bracket. The L-bracket consists of two plates whose ends meet at right angles, so that when viewed from the side, the shape resembles the letter L. One plate is attached to the tank walls so that the other plate extends perpendicularly from the walls. The lip rests on the plate extending from the wall.

The droplines in such a system generally extend from a circular feeder, although other configurations are used. The feeder is a pipe ring which is connected to a pressure source. The entire piping system is frequently comprised of ½ to ¾ inch PVC pipe. The droplines, piping with one or more openings near the end, are fluidly connected to the feeder so that when compressed air is pumped into the feeder, it will be emitted from the droplines.

The feeder rests on the L-bracket between the wall and the clarifier lip. The L-bracket contains a hole which is sized to fit a dropline, so that the droplines extend down through an L-bracket to near the bottom of the tank. Pumping air through the droplines causes them to oscillate much like an untended garden hose. This oscillation can cause damage to the droplines and to the fittings which connect the droplines to the circular feeder.

In order to prevent oscillation, the pipe ends are held to the tank walls with a retainer. This retainer comprises a semi-circular ring which fits around the pipe and holds it in place. A problem arises with this retainer because it must be attached to the tank wall below the water line. This often entails using screws or bolts which pass through the tank wall, creating a potential leak. Welding the retainer to the wall can also create a weak spot in the tank wall which can potentially lead to a leak. If adhesives are used to attach the fitting to the tank wall, there is a risk that, over time, the adhesive will give way and allow the dropline to oscillate and potentially damage the system.

OBJECTS OF THE INVENTION

It is an object of the invention to provide a clip for supporting the clarifier in a wastewater treatment system.

It is another object of the invention to provide a clip for supporting the droplines and the feeder in a wastewater treatment system.

It is another object of the invention to prevent the droplines from oscillating.

It is yet another object of the invention to reduce the likelihood that the wastewater system will leak.

SUMMARY OF THE INVENTION

A clip for supporting the clarifier and the droplines in a wastewater treatment system is disclosed. The clip comprises a pair of parallel main plates separated by a bracing plate. The bracing plate is perpendicular to the main plates and is attached to the ends of each. Attached to the free ends of each of the main plates are a pair of mounting plates. These mounting plates are parallel to the bracing plate. In a preferred embodiment, the main plates each contain a hole. This pair of holes are vertically aligned, and each hole is sized to contain a dropline. In an alternate embodiment, the function of the holes may be accomplished using a pair of vertically aligned rings extending from and parallel to the main plates.

The clip should be positioned so that the main plates are substantially parallel to the water level in the tank. At least the first mounting plate should be attached above the water level. This first mounting plate may be bolted, riveted or otherwise attached to the tank wall without creating a potential leak. The second mounting plate will rest against the tank wall. It may be attached to the wall if desired; however, the second mounting plate need not be attached.

The first main plate will support the lip of the clarifier. In a preferred embodiment, the lip may be bolted or otherwise attached to the first main plate. The circular feeder will rest on the first main plate either between the lip of the clarifier and the tank wall or on top of the lip. The droplines will extend from the circular feeder through the paired holes contained in the main plates.

A means for receiving cable ties or other tying instruments such as cord or wire may be provided on the first main plate. These means may include rings, loops, hooks or eyelets attached to the first main plate or holes in the first main plate. Another means which may be convenient to manufacture would be a stamped protuberance in the first main plate. Removing the ends of this protuberance so as to provide passage through the protuberance would create a means for receiving tying instruments. These tying instruments may be used to secure the circular feeder to the first main plate.

The holes in the main plates fit the droplines closely. The main plates hold the droplines and prevent oscillation. The distance which the main plates should be separated depends upon the length and flexibility of the droplines and the pressure of the air pumped through the lines. The greater the separation, the more rigid each dropline will become. The inventor has found that a 5.5 inch separation works well in a system having three to eight ¾ inch schedule 40 PVC droplines, approximately five feet long each, and using compressed air at about 1.5 to 3 p.s.i.

In another embodiment, a support plate is attached to the free end of the first mounting plate. This support plate is substantially perpendicular to the first mounting plate and extends away from the bracing plate. The support plate will rest on top of the tank wall when the first mounting plate is adjacent to the tank wall. The tank top will hold the support plate in place. In a preferred embodiment, the support plate may be attached to the tank wall with screws or bolts or other conventional attachment instruments. It is anticipated that this embodiment will be most useful in concrete tanks because of the thickness of the walls of such tanks.

DETAILED DESCRIPTION OF THE DRAWINGS

Figure 1:
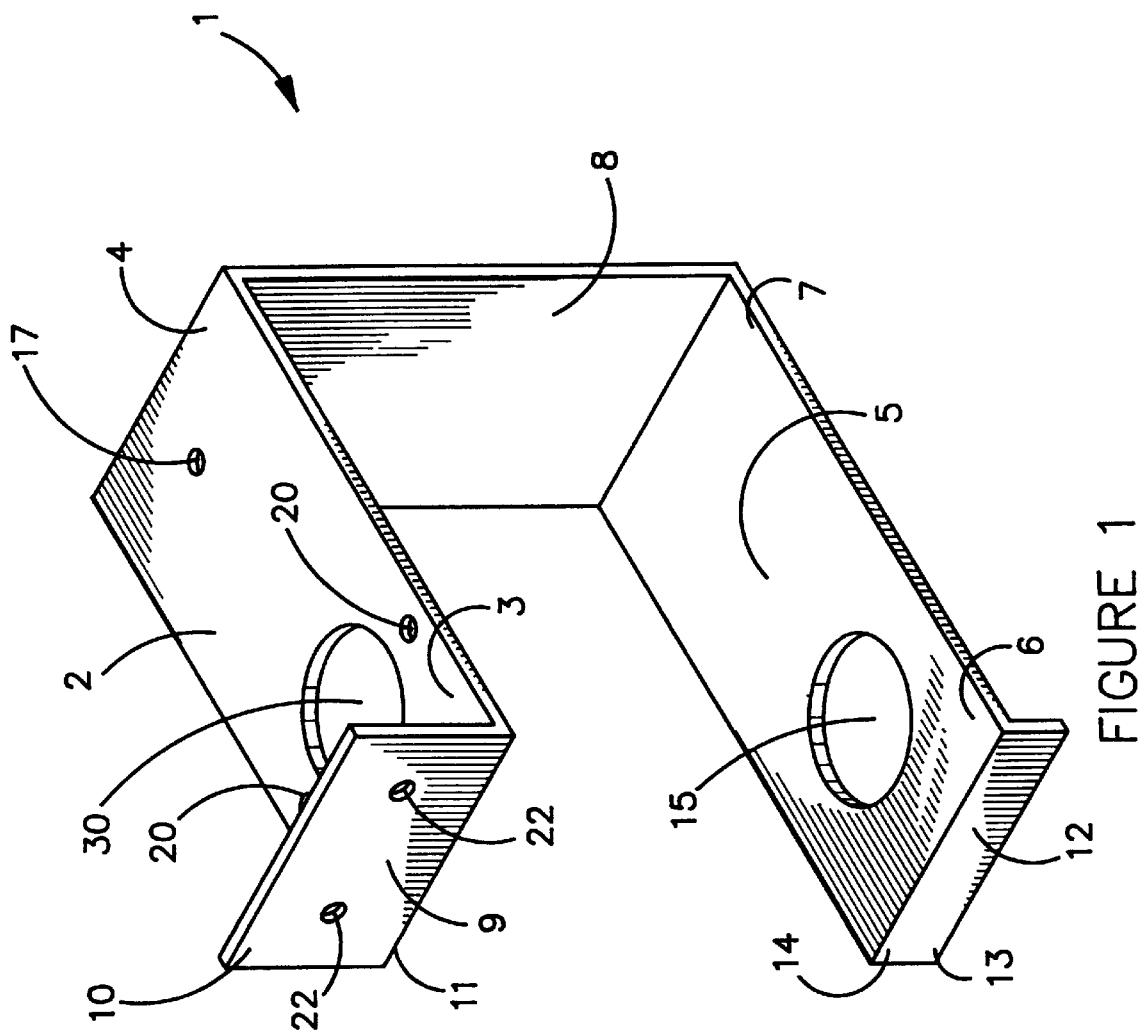
FIG. 1 is a depiction of a clip.

FIG. 1 depicts a clip 1. Clip 1 comprises a first main plate 2 having a first end 3 and a second end 4. Clip 1 also comprises a second main plate 5 having a first end 6 and a second end 7. First main plate 2 and second main plate 5 are substantially parallel and are connected by a bracing plate 8. Bracing plate 8 is substantially perpendicular to first main plate 2 and second main plate 5 and is attached to second end 4 of first main plate 2 and second end 7 of second main plate 5.

Clip 1 also comprises a first mounting plate 9 having a first end 10 and a second end 11. Second end 11 of first mounting plate 9 is attached to first end 3 of first main plate 2. First mounting plate 9 is substantially perpendicular to first main plate 2. Clip 1 also comprises a second mounting plate 12 having a first end 13 and a second end 14. Second end 14 of second mounting plate 12 is attached to first end 6 of second main plate 5. Second mounting plate 12 is substantially perpendicular to second main plate 5.

Figure 3:
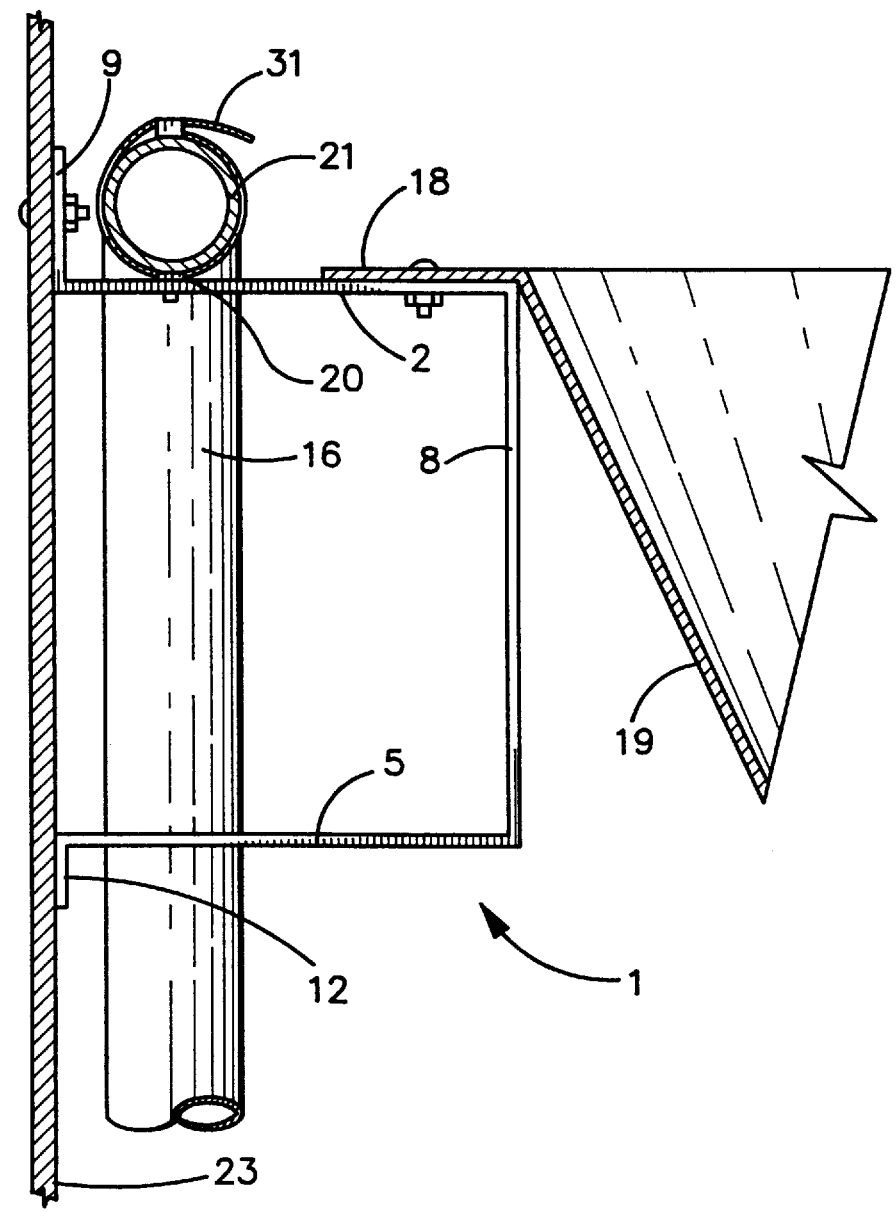
FIG. 3 is a depiction of cross sectional view of an aerobic wastewater treatment system having a clarifier and droplines supported by a clip.

In a preferred embodiment, first main plate 2 contains a first dropline aperture 30 and second main plate 5 contains a second dropline aperture 15. First and second dropline apertures 30 and 15 are sized to receive droplines 16, as depicted in FIG. 3. First and second dropline apertures 30 and 15 should be substantially aligned.

In another preferred embodiment, first main plate 2 is provided with a hole 17 near second end 4. Lip 18 of clarifier 19 may be secured to clip 1 using a bolt or screw and hole 17 or a rivet or other conventional attachment means. More than one hole 17 may be provided if desired.

In another preferred embodiment, first main plate 2 contains a means for receiving tying instruments 20 such as cable ties 31, cord or wire. This means for receiving tying instruments 20 may include rings, loops, hooks or eyelets attached to first main plate 2 or holes in first main plate 2. Another means for receiving tying instruments 20 which may be convenient to manufacture would be a stamped protuberance in first main plate 2. Removing the ends of this protuberance so as to provide passage through the protuberance would form a means for receiving tying instruments 20. These tying elements may be used to secure the circular feeder 21 to the first main plate 2.

In another preferred embodiment, first mounting plate 9 contains one or more holes 22. First mounting plate 9 may be secured to tank walls 23 using bolts or screw and holes 22. Holes 22 should be sized to fit the appropriate attachment hardware.

Figure 2:
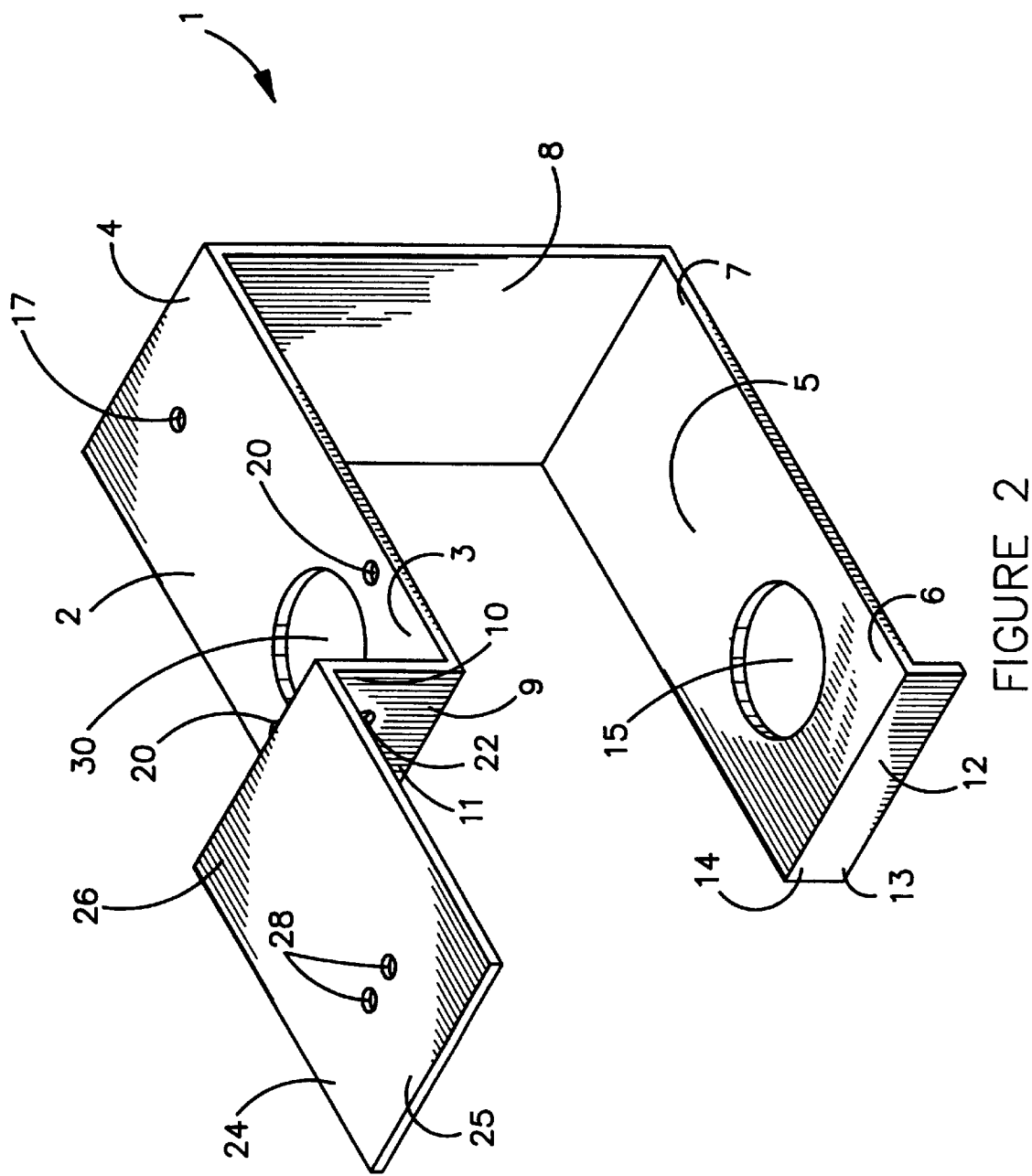
FIG. 2 is a depiction of a clip with a support plate.

In another preferred embodiment clip 1 also comprises a support plate 24 having a first end 25 and a second end 26, as shown in FIG. 2. Second end 26 of support plate 24 is attached to first end 10 of first mounting plate 9. Support plate 24 is substantially perpendicular to first mounting plate 9 and extends away from bracing plate 8. When first mounting plate 9 is flush against tank walls 23, support plate 24 will rest on top of tank walls 23. The tank top will rest on top of tank walls 23 and hold support plate 24 in place. Support plate 24 may contain one or more holes 28 to facilitate attachment of support plate 24 to tank walls 23.

In operation, as shown in FIG. 3, clip 1 will be attached to tank walls 23. First and second main plates 2 and 5 should be substantially parallel to the water level in tank. First mounting plate 9 should be attached above the water level. Lip 18 of clarifier 19 will rest on first main plate 2. Circular feeder 21 will rest on first main plate 2 between lip 18 and tank walls 23. Dropline 16 will extend downward through first and second dropline apertures 30 and 15. First main plate 2 and second main plate 5 will hold dropline 16 and prevent it from oscillating.

Other uses and embodiments of the invention will occur to those skilled in the art, and are intended to be included within the scope and spirit of the following claims.

I claim:

1. In an aerated wastewater treatment tank having a top, a bottom, and tank walls extending therebetween, said tank further comprising a conical clarifier positioned within said tank, said clarifier having a wide end and a narrow end, said clarifier having a lip extending from said wide end, and a plurality of substantially vertical droplines extending downwardly into said tank between said clarifier and said tank walls wherein the improvement comprises:

a plurality of clips, each said clip comprising a first main plate having a first end and a second end;

a first mounting plate having a first end, said first mounting plate also having a second end attached to said first end of said first main plate, said first mounting plate being substantially perpendicular to said first main plate;

a second main plate having a first end and a second end, said second main plate being substantially parallel to said first main plate;

a second mounting plate having a first end, said second mounting plate also having a second end attached to said first end of said second main plate, said second mounting plate being substantially perpendicular to said second main plate; and a bracing plate having a first end attached to said second end of said first main plate, said bracing plate also having a second end attached to said second end of said second main plate, said bracing plate being substantially perpendicular to said first main plate and to said second main plate;

wherein said clips are mounted to said tank walls so that said mounting plates face said tank walls and so that said first main plate is substantially horizontally disposed whereby said clarifier lip may be supported by said plurality of clips.

2. An aerated wastewater treatment tank according to claim 1 wherein said first main plate of said clip contains a first dropline aperture; wherein said second main plate of said clip contains a second dropline aperture, wherein said first dropline aperture and said second dropline aperture are substantially aligned, and wherein said clip is mounted to said tank walls so that said dropline apertures are substantially vertically aligned, whereby said dropline apertures may secure a dropline.

3. An aerated wastewater treatment tank according to claim 2 wherein said tank walls have tops; wherein said clip further comprises a support plate having a first end, said support plate also having a second end attached to said first end of said first mounting plate, said support plate being substantially perpendicular to said first mounting plate; and wherein said clips are mounted to said tank walls so that said support plate extends over said tops of said tank walls.

4. An aerated wastewater treatment tank according to claim 2 wherein said first main plate contains a means for receiving tying instruments.

5. An aerated wastewater treatment tank according to claim 1 wherein said tank walls have tops; wherein said clip further comprises a support plate having a first end, said support plate also having a second end attached to said first end of said first mounting plate, said support plate being substantially perpendicular to said first mounting plate; and wherein said clips are mounted to said tank walls so that said support plate extends over said tops of said tank walls.

6. An aerated wastewater treatment tank according to claim 5 wherein said first main plate contains a means for receiving tying instruments.

7. An aerated wastewater treatment tank according to claim 1 wherein said first main plate contains a means for receiving tying instruments.

8. In an aerated wastewater treatment tank having tank walls, said tank further comprising a conical clarifier positioned within said tank, said clarifier having a wide end and a narrow end, said clarifier having a lip extending from said wide end, and a plurality of substantially vertical droplines extending downwardly into said tank between said clarifier and said tank walls wherein the improvement comprises:

a plurality of clips, each said clip comprising a first main plate having a first end and a second end, said first main plate further comprising a first dropline aperture;

a first mounting plate having a first end, said first mounting plate also having a second end attached to said first end of said first main plate, said first mounting plate being substantially perpendicular to said first main plate;

a second main plate having a first end and a second end, said second main plate being substantially parallel to said first main plate, said second main plate further comprising a second dropline aperture;

a second mounting plate having a first end, said second mounting plate also having a second end attached to said first end of said second main plate, said second mounting plate being substantially perpendicular to said second main plate; and a bracing plate having a first end attached to said second end of said first main plate, said bracing plate also having a second end attached to said second end of said second main plate, said bracing plate being substantially perpendicular to said first main plate and to said second main plate, said first main plate and said second main plate configured relative to said bracing plate so that said first dropline aperture and said second dropline aperture are substantially aligned;

wherein said clips are mounted to said tank walls so that said mounting plates face said tank walls and so that said first dropline aperture and said second dropline aperture are substantially vertically aligned whereby said dropline apertures may secure a dropline.

9. An aerated wastewater treatment tank according to claim 8 wherein said clips are mounted to said tank walls so that said mounting plates face said tank walls and so that said first main plate is substantially horizontally disposed whereby said clarifier lip may be supported by said plurality of clips.

10. An aerated wastewater treatment tank according to claim 9 wherein said tank walls have tops; wherein said clip further comprises a support plate having a first end, said support plate also having a second end attached to said first end of said first mounting plate, said support plate being substantially perpendicular to said first mounting plate; and wherein said clips are mounted to said tank walls so that said support plate extends over said tops of said tank walls.

11. An aerated wastewater treatment tank according to claim 9 wherein said first main plate contains a means for receiving tying instruments.

12. An aerated wastewater treatment tank according to claim 8 wherein said tank walls have tops; wherein said clip further comprises a support plate having a first end, said support plate also having a second end attached to said first end of said first mounting plate, said support plate being substantially perpendicular to said first mounting plate; and wherein said clips are mounted to said tank walls so that said support plate extends over said tops of said tank walls.

13. An aerated wastewater treatment tank according to claim 12 wherein said first main plate contains a means for receiving tying instruments.

14. An aerated wastewater treatment tank according to claim 8 wherein said first main plate contains a means for receiving tying instruments.

* * * * *